(12) United States Patent
Liu et al.

(10) Patent No.: US 8,004,329 B1
(45) Date of Patent: Aug. 23, 2011

(54) HARDWARE PERFORMANCE MONITOR (HPM) WITH VARIABLE RESOLUTION FOR ADAPTIVE VOLTAGE SCALING (AVS) SYSTEMS

(75) Inventors: Hsing-Chien Roy Liu, Cupertino, CA (US); Wai Cheong Chan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 12/661,560

(22) Filed: Mar. 19, 2010

(51) Int. Cl.
*H03L 7/00* (2006.01)

(52) U.S. Cl. ........ 327/161; 327/271; 327/284; 713/300; 713/401; 713/501

(58) Field of Classification Search ........... 327/152, 327/153, 161, 261, 262, 269–272, 276–278, 327/281, 284, 285, 288; 713/300, 401, 500, 713/501
See application file for complete search history.

(56) References Cited

U.S. PATENT DOCUMENTS

| | | | | |
|---|---|---|---|---|
| 3,502,994 | A | * | 3/1970 | Ott et al. ............... 327/277 |
| 5,389,843 | A | * | 2/1995 | McKinney ............. 327/276 |
| 5,444,406 | A | * | 8/1995 | Horne .................... 327/277 |
| 5,515,403 | A | * | 5/1996 | Sloan et al. ............ 375/371 |
| 5,604,775 | A | * | 2/1997 | Saitoh et al. ........... 375/376 |
| 5,670,904 | A | * | 9/1997 | Moloney et al. ....... 327/277 |
| 6,094,082 | A | | 7/2000 | Gaudet |
| 6,100,735 | A | * | 8/2000 | Lu .......................... 327/158 |
| 6,121,808 | A | | 9/2000 | Gaudet |
| 6,194,928 | B1 | * | 2/2001 | Heyne ..................... 327/152 |
| 6,798,258 | B2 | * | 9/2004 | Rieven .................... 327/152 |
| 6,944,780 | B1 | | 9/2005 | Kranzen et al. |
| 6,985,025 | B1 | | 1/2006 | Maksimovic et al. |
| 7,024,568 | B2 | | 4/2006 | Maksimovic et al. |
| 7,069,461 | B1 | | 6/2006 | Chan et al. |
| 7,106,040 | B1 | | 9/2006 | Maksimovic et al. |
| 7,113,014 | B1 | | 9/2006 | Doyle |
| 7,117,378 | B1 | | 10/2006 | Maksimovic et al. |
| 7,206,959 | B1 | | 4/2007 | Chan et al. |
| 7,224,199 | B1 | | 5/2007 | Kang |
| 7,289,921 | B1 | | 10/2007 | Salmi et al. |
| 7,378,893 | B1 | | 5/2008 | Kang |

OTHER PUBLICATIONS

Hsiang-Hui Chang, et al., "A Wide-Range and Fast-Locking All-Digital Cycle-Controlled Delay-Locked Loop", IEEE Journal of Solid-State Circuits, vol. 40, No. 3, Mar. 2005, p. 661-670.

(Continued)

*Primary Examiner* — Lincoln Donovan
*Assistant Examiner* — William Hernandez

(57) ABSTRACT

An apparatus includes a delay line having multiple delay cells coupled in series. The delay line is configured to receive an input signal and to propagate the input signal through the delay cells. The apparatus also includes multiple sampling circuits configured to sample the input signal at different taps in the delay line and to output sampled values. The delay line has (i) a finer resolution closer to a target tap and (ii) a coarser resolution farther away from the target tap on each side of the target tap. For example, taps nearer the target tap can be closer to each other in order to support the finer resolution, and taps farther from the target tap can be farther apart from each other in order to support the coarser resolution. The apparatus can further include an encoder configured to encode the sampled values in order to generate an encoded value.

20 Claims, 2 Drawing Sheets

OTHER PUBLICATIONS

Jong-Tae Kwak et al., "A Low Cost High Performance Register-Controlled Digital DLL for 1 Gbps x32 DDR SDRAM," 2003 Symposium on VLSI Circuits Digest of Technical Papers, pp. 283-284.

Kazuyuki Nakamura et al, "A CMOS 50% Duty Cycle Repeater Using Complementary Phase Blending," IEEE, 2000 Symposium on VLSI Circuits Digest of Technical Papers, pp. 48-49.

Tatsuya Matano et al., "A 1-Gb/s/pin 512-Mb DDRII SDRAM Using a Digital DLL and a Slew-Rate-Controlled Output Buffer," IEEE Journal of Solid-State Circuits, vol. 38, No. 5, May 2003, pp. 762-768.

Jang-Jin Nam et al., "An All-Digital CMOS Duty Cycle Correction Circuit with a Duty-Cycle Correction Range of 15%-to-85% for Multi-Phase Applications," IEICE Trans. Electron, vol. E88-C, No. 4, Apr. 2005, pp. 773-777.

\* cited by examiner

US 8,004,329 B1

HARDWARE PERFORMANCE MONITOR (HPM) WITH VARIABLE RESOLUTION FOR ADAPTIVE VOLTAGE SCALING (AVS) SYSTEMS

TECHNICAL FIELD

This disclosure is generally directed to power supply systems. More specifically, this disclosure is directed to a hardware performance monitor (HPM) with variable resolution for adaptive voltage scaling (AVS) systems.

BACKGROUND

Many systems use adaptive voltage scaling (AVS) loops to control the supply of power to components of the systems. An example AVS loop may include multiple delay cells coupled in series, where the speed of the delay cells varies based on a supply voltage. A signal can be sent through the delay cells, and the supply voltage can be adjusted until the signal reaches a first one of the delay cells and not a second one of the delay cells. In this way, the AVS loop can help to estimate the supply voltage necessary to achieve a desired level of performance.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
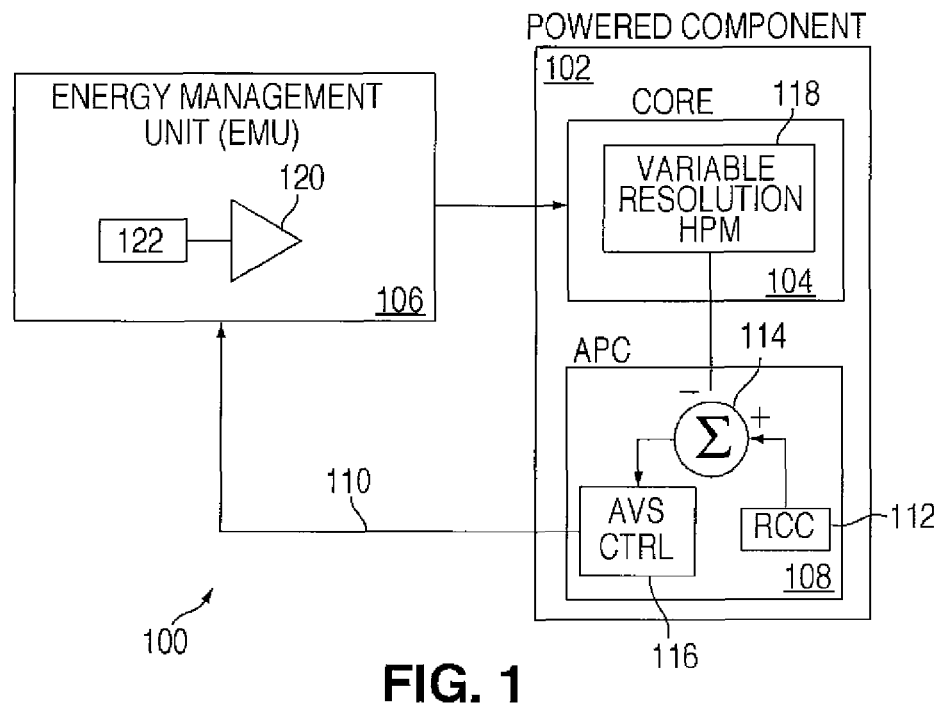
FIG. 1 illustrates an example powered system having a hardware performance monitor with variable resolution for adaptive voltage scaling according to this disclosure.
Figure 3:
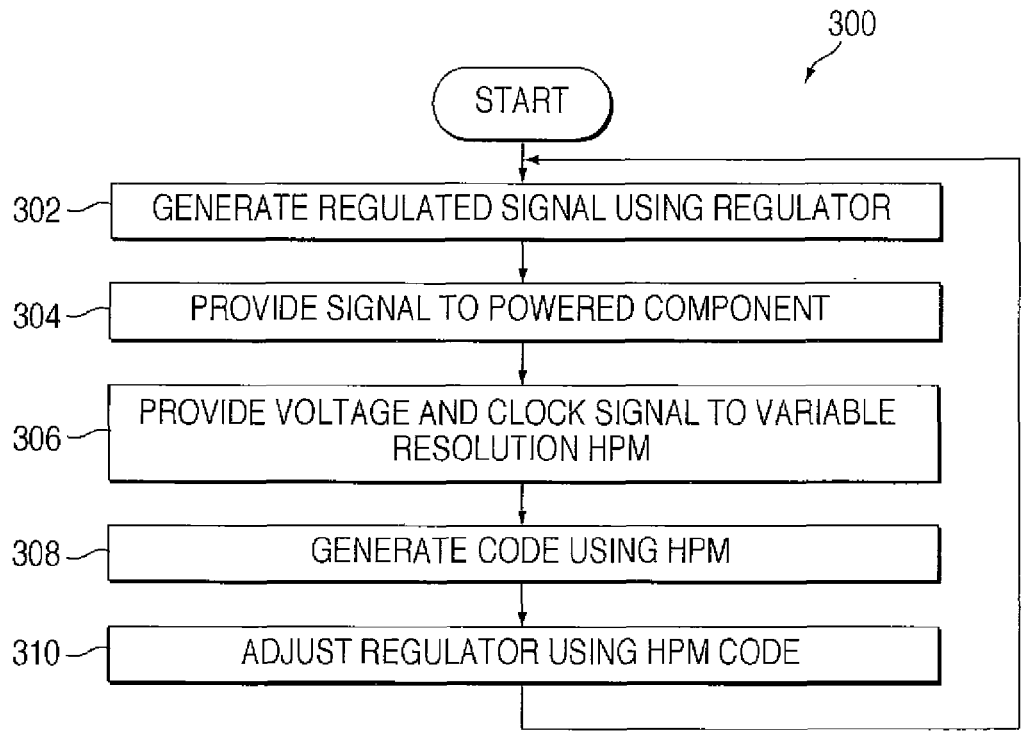
FIG. 3 illustrates an example method for powering a system using a hardware performance monitor with variable resolution according to this disclosure.
Figure 2:
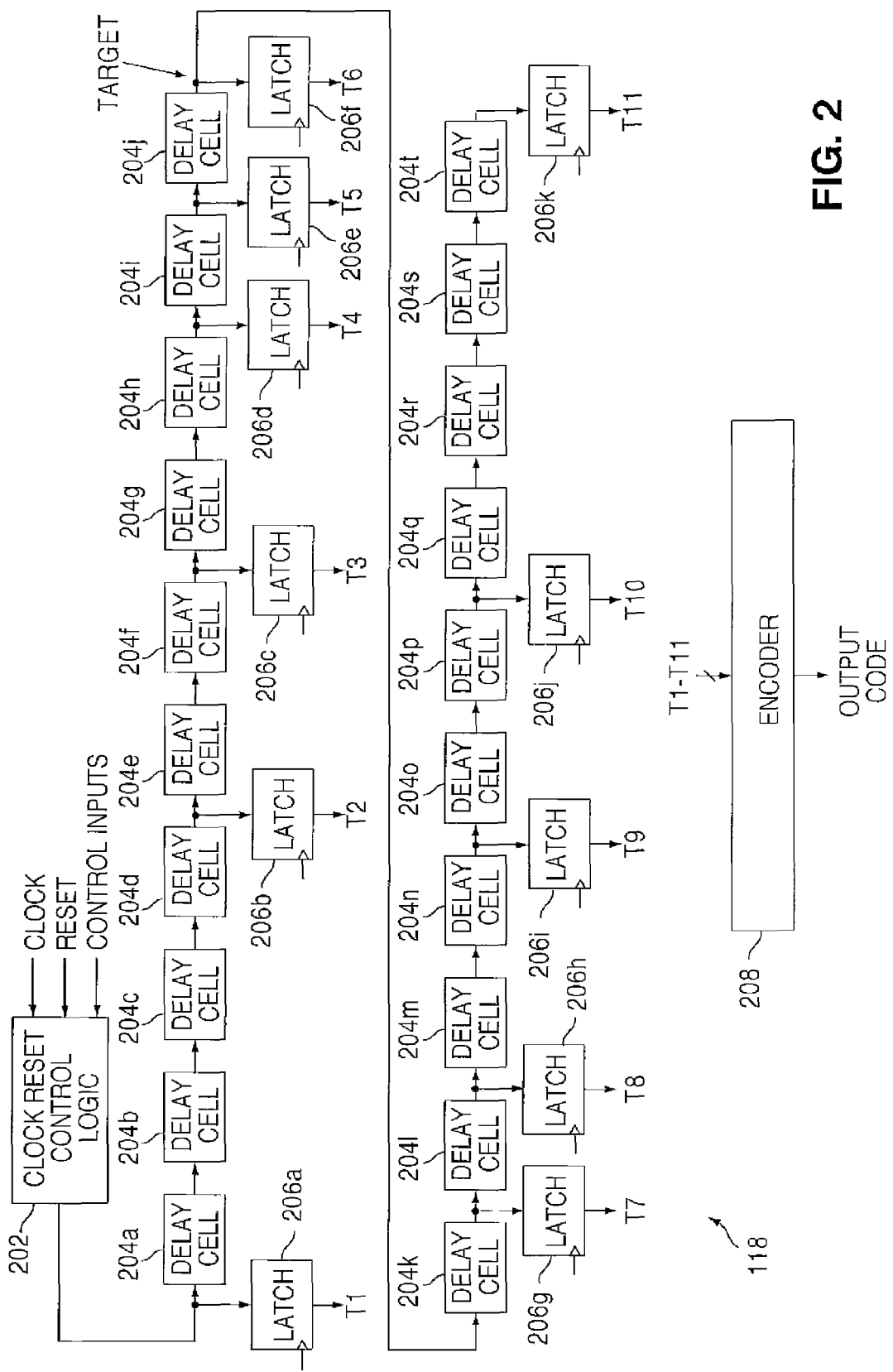
FIG. 2 illustrates an example hardware performance monitor with variable resolution according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

FIG. 1 illustrates an example powered system 100 having a hardware performance monitor with variable resolution for adaptive voltage scaling (AVS) according to this disclosure. The embodiment of the powered system 100 shown in FIG. 1 is for illustration only. Other embodiments of the powered system 100 could be used without departing from the scope of this disclosure.

As shown in FIG. 1, the powered system 100 includes a powered component 102 that is being powered. The powered component 102 could represent any suitable component that receives operating power, such as a processing device like a microprocessor, microcontroller, digital signal processor, or application specific integrated circuit. Note that a processing device represents only one example type of component that could be powered in the system 100. Any other or additional type(s) of powered component(s) could be used in the system 100.

In this example, the powered component 102 includes a core 104, which generally denotes the portion of the powered component 102 responsible for performing core operations of the powered component 102. In a processing device, for example, the core 104 could represent a processing core that executes instructions. The core 104 receives a supply voltage from an energy management unit (EMU) 106. The core 104 includes any suitable structure for performing core processing or other functions in the powered component 102.

The powered component 102 also includes an advanced power controller (APC) 108. The APC 108 performs operations to generate one or more control signals 110, which adjusts the supply voltage provided by the EMU 106 to the powered component 102. In this example, the APC 108 includes a reference calibration code (RCC) table 112, which acts as a digital reference for the AVS loop. The RCC table 112 could, for instance, store a digital reference value for each frequency of a clock signal that could be used by the core 104. When the clock frequency used by the core 104 changes, the RCC table 112 could output a different digital reference value. The APC 108 also includes a summer 114 and an AVS control unit 116. The summer 114 subtracts an output of a hardware performance monitor (HPM) 118 from the appropriate digital reference value provided by the RCC table 112. This provides an indication whether the operation of the core 104 varies from the digital reference and, if any variation is present, the extent of that variation. The AVS control unit 116 uses the output of the summer 114 to generate the control signals 110. For example, if the output of the summer 114 indicates that the core 104 is operating too slowly, the control signals 110 could cause the EMU 106 to increase the supply voltage. If the output of the summer 114 indicates that the core 104 is operating faster than necessary, the control signals 110 could cause the EMU 106 to decrease the supply voltage to save power.

The APC 108 includes any suitable structure for adjusting a regulated signal for a powered component. The RCC table 112 includes any suitable structure for storing and retrieving digital reference values for an AVS loop. The summer 114 includes any suitable structure for combining values. The AVS control unit 116 includes any suitable structure for compensating an AVS loop. Details of example advanced power controllers implementing AVS technology can be found in the following U.S. patents, all of which are hereby incorporated by reference: U.S. Pat. No. 7,581,131; U.S. Pat. No. 7,581,120; U.S. Pat. No. 7,493,149; U.S. Pat. No. 7,479,768; U.S. Pat. No. 7,289,921; U.S. Pat. No. 7,117,378; U.S. Pat. No. 7,106,040; U.S. Pat. No. 7,024,568; U.S. Pat. No. 6,985,025; U.S. Pat. No. 6,944,780; U.S. Pat. No. 6,868,503; and U.S. Pat. No. 6,548,991.

The HPM 118 monitors the operation of the core 104. For example, the HPM 118 could measure the propagation delay of digital operations in the core 104. The propagation delay could vary based on a number of factors, such as process, voltage, and temperature (PVT) variations. The HPM 118 outputs a code to the APC 108, where the code identifies the operation of the core 104. The code could, for example, represent a measure of the propagation delay in the core 104.

The HPM 118 includes multiple delay cells coupled in series to form a delay line, and a signal is propagated through the delay cells in the delay line. Taps represent points between delay cells where the signal can be sampled in the delay line, and the samples of the signal at the taps can be used by the HPM 118 to determine how far the signal propagates through the delay line in a given period of time. This allows the HPM 118 to measure the propagation delay in the core 104 under a current set of operating conditions.

As described in more detail below, the taps in the HPM 118 are non-linear, meaning the taps are not distributed evenly or linearly in the delay line. In this way, more taps can be placed around a target tap, where the target tap identifies the desired level of propagation delay in the core 104. This provides higher resolution when the propagation delay in the core 104 is closer to the desired level. Also, fewer taps can be placed farther away from the target tap, providing lower resolution when the propagation delay in the core 104 is farther away from the desired level. For this reason, the HPM 118 can be referred to as a "variable resolution" HPM. One example embodiment of the HPM 118 is shown in FIG. 2, which is described below.

In the example shown in FIG. 1, the EMU 106 includes a voltage regulator 120 and circuitry 122 that adjusts operation of the voltage regulator 120 according to the control signals 110 from the APC 108. In this way, the voltage generated by the voltage regulator 120 can be adjusted based on the measurements taken by the HPM 118. Ideally, the voltage regulator 120 is adjusted until the voltage provides a desired propagation delay in the HPM 118. The EMU 106 includes any suitable structure for generating a controllable output voltage or output current. The voltage regulator 120 includes any suitable structure for generating a regulated voltage. The circuitry 122 includes any suitable circuitry for adjusting operation of the voltage regulator 120.

Although FIG. 1 illustrates one example of a powered system 100 having an HPM 118 with variable resolution for adaptive voltage scaling, various changes may be made to FIG. 1. For example, a system could be used to provide operating power to any suitable type(s) and number(s) of powered component(s). Also, various components shown in FIG. 1 could be combined, further subdivided, omitted, or moved according to particular needs. For instance, the APC 108 could reside outside of the powered component 102, such as in the EMU 106 or outside of the EMU 106. In these cases, the HPM 118 could provide the control signals 110 through one or more I/O pins or other interfaces to the APC 108 or other component.

FIG. 2 illustrates an example hardware performance monitor (HPM) 118 with variable resolution according to this disclosure. The embodiment of the HPM 118 shown in FIG. 2 is for illustration only. Other embodiments of the HPM 118 could be used without departing from the scope of this disclosure.

As shown in FIG. 2, the HPM 118 includes a clock reset control logic unit 202, which provides a signal that propagates through a delay line formed by a series of delay cells 204a-204t. For example, the clock reset control logic unit 202 could output a signal that pulses high, and the HPM 118 can determine the propagation delay of the core 104 based on how far the high pulse traverses through the delay line. The clock reset control logic unit 202 in this example receives a clock signal, a reset signal, and one or more control signals. The clock signal could represent any suitable clock signal having any suitable frequency, such as the frequency to be used by other circuitry in the core 104. The frequency of the clock signal can also change, such as when the clock signal frequency is changed based on a current processing load or other conditions in the core 104. The reset signal causes the clock reset control logic unit 202 to reset the signal being output, and the control signals adjust the operation of the clock reset control logic unit 202. The clock reset control logic unit 202 includes any suitable structure for controllably providing a signal to a delay line.

The signal from the clock reset control logic unit 202 passes through the series of delay cells 204a-204t in the delay line. The amount of delay provided by each of the delay cells 204a-204t typically varies based on the supply voltage provided by the EMU 106. Each of the delay cells 204a-204t includes any suitable structure for delaying a signal. Each of the delay cells 204a-204t could, for example, include multiple inverters coupled in series.

As the signal from the clock reset control logic unit 202 passes through the delay cells 204a-204t, the signal can be sampled at multiple taps. Each tap denotes a point where a signal can be sampled. In FIG. 2, the signal is sampled at multiple taps by latches 206a-206k. The samples of the signal can be used to identify how far the signal traverses through the delay line in a given amount of time. Each of the latches 206a-206k samples and holds the value of the signal at a specific tap. Each of the latches 206a-206k includes any suitable structure for sampling a signal, such as a D flip-flop. In this example, the latches 206a-206k are clocked by a clock signal, which defines the time at which the propagation of the signal is measured.

The sampled values T1-T11 of the signal taken by the latches 206a-206k are provided to an encoder 208, which encodes the values to generate an output code. For example, as noted above, the samples T1-T11 can identify how far a signal traverses through the delay line in a given amount of time. The encoder 208 can then generate an output code that identifies the distance that the signal traverses through the delay line. The encoder 208 includes any suitable structure for encoding values to generate output codes.

In some embodiments, the signal traversing through the delay line may be expected to reach but not exceed a target tap, which in this example immediately follows the delay cell 204j. This means that a pulse in the signal is expected to reach the output of the delay cells 204a-204j but not the output of the delay cells 204k-204t. When the timing varies (meaning the pulse fails to reach the output of the delay cell 204j or reaches the output of any subsequent delay cell 204k-204t), the AVS system attempts to adjust the supply voltage provided by the EMU 106. Ideally, the AVS system adjusts the supply voltage quickly and causes a pulse in the signal to reach as far as the target tap and no further.

It is often not important to have fine resolution when sampling at the taps shows that a pulse in the signal has reached a point far away from the target tap in the delay line. In this case, the AVS system tends to make larger adjustments to the supply voltage in order to move the pulses in the signal to the target tap quickly. Fine resolution is typically needed only when sampling at the taps shows that a pulse in the signal has reached a point close to the target tap. In that case, the AVS system tends to make smaller adjustments to the supply voltage in order to move the pulses in the signal to the target tap. Moreover, fine resolution is often desired so that the AVS system can make smaller adjustments to the supply voltage in order to keep the pulses at the target tap.

The HPM 118 in FIG. 2 therefore supports multiple resolutions. Around the target tap, the latches 206d-206h are closer together, each separated from its nearest neighboring tap(s) by a single delay cell. As a result, these taps support a finer resolution. Farther away from the target tap, each of the latches 206b-206c and 206i-206j is separated from its nearest neighboring tap(s) by two delay cells. As a result, these taps support a coarser resolution. Even farther away from the target tap, each of the latches 206a and 206k is separated from its nearest neighboring tap(s) by four delay cells. As a result, these taps support an even coarser resolution. Additional delay cells farther away from the target tap could be separated from their nearest neighboring tap(s) by even larger amounts. In other words, the distance between adjacent latches (and therefore adjacent taps) increases starting from the target tap and moving in either direction of the delay line.

By placing taps in this non-linear arrangement, the structure of the HPM 118 can be simplified. More specifically, since fewer taps are used, fewer latches or other sample and hold circuits may be needed in the circuit. Since flip-flops can occupy a much larger area than delay cells, this can significantly reduce the size of the HPM 118 and can reduce variation between delay cells. Moreover, since fewer taps are used, the encoder 208 can implement less complex encoding logic. As a particular example, the encoder 208 could receive eleven one-bit input signals and generate six-bit output codes. In particular embodiments, the encoder 208 could operate as shown in Table 1. As shown in Table 1, the first bit of non-zero output codes effectively acts as a "sign" or direction bit to indicate whether a pulse in the signal reaches a tap that is before or after the target tap. The remaining bits identify the last tap to receive the pulse in the signal.

TABLE 1

| Signal Reaches Up To | Output Code | Description |
|---|---|---|
| Latch 206a | 110000 | Ten delay cells behind target |
| Latch 206b | 101000 | Six delay cells behind target |
| Latch 206c | 100100 | Four delay cells behind target |
| Latch 206d | 100010 | Two delay cells behind target |
| Latch 206e | 100001 | One delay cell behind target |
| Latch 206f | 000000 | At target |
| Latch 206g | 000001 | One delay cell ahead of target |
| Latch 206h | 000010 | Two delay cells ahead of target |
| Latch 206i | 000100 | Four delay cells ahead of target |
| Latch 206j | 001000 | Six delay cells ahead of target |
| Latch 206k | 010000 | Ten delay cells ahead of target |

Although FIG. 2 illustrates one example of an HPM 118 with variable resolution, various changes may be made to FIG. 2. For example, the HPM 118 could include any number of delay cells and any number of latches at any number of taps, as long as the HPM is arranged to have a non-linear resolution. Also, the HPM 118 in FIG. 2 is generally symmetrical, meaning the taps are symmetrical about the target tap. However, this need not be the case. For instance, the taps farther away on the left of the target tap could be arranged differently than the taps farther away on the right of the target tap, while the taps near the target tap could be symmetrical. Other arrangements could also be used.

FIG. 3 illustrates an example method 300 for powering a system using a hardware performance monitor with variable resolution according to this disclosure. The embodiment of the method 300 shown in FIG. 3 is for illustration only. Other embodiments of the method 300 could be used without departing from the scope of this disclosure.

As shown in FIG. 3, a regulated signal is generated using a regulator at step 302. This could include, for example, generating a regulated output voltage using the voltage regulator 120 in the EMU 106. The voltage regulator 120 could generate the output voltage based on one or more control signals 110 from the powered component 102. The regulated signal is provided to the powered component at step 304.

A voltage and a clock signal are provided to an HPM at step 306. This could include, for example, providing a clock signal having a frequency to be used by the core 104 to the HPM 118. This could also include providing the output voltage from the EMU 106 to logic gates forming the delay cells 204a-204t in the HPM 118. The voltage provided to the delay cells 204a-204t in the HPM 118 could also be based on the output voltage from the EMU 106. The HPM 118 is a variable resolution HPM since the taps in the delay line are non-linearly spaced.

A code is generated using the HPM at step 308. This could include, for example, the clock reset control logic unit 202 sending a high pulse through the delay line in the HPM 118. This could also include the latches 206a-206k in the HPM 118 sampling and holding the outputs of various delay cells. This could further include the encoder 208 encoding the outputs of the latches 206a-206k to generate the output code. The regulator is adjusted using the output code generated by the HPM at step 310. This could include, for example, the EMU 106 making larger changes to the regulated output voltage when the pulse in the HPM 118 reaches a tap farther away from the target tap and smaller changes to the regulated output voltage when the pulse in the HPM 118 reaches a tap closer to the target tap. The lower resolution of the HPM 118 farther away from the target tap supports the larger changes to the regulated output voltage, while the higher resolution of the HPM 118 closer to the target tap supports the smaller changes to the regulated output voltage needed to finely tune the regulated output voltage. The method 300 then returns to step 302 to continue generating the regulated output signal using the adjusted regulator.

Although FIG. 3 illustrates one example of a method 300 for powering a system using an HPM with variable resolution, various changes may be made to FIG. 3. For example, while shown as a series of steps, various steps in FIG. 3 could overlap, occur in parallel, occur in a different order, or occur multiple times. As a particular example, the regulator may continuously operate to produce the regulated output signal at steps 302-304. In parallel, the HPM 118 could operate to adjust the regulator at steps 306-310.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a delay line comprising multiple delay cells coupled in series, the delay line configured to receive an input signal and to propagate the input signal through the delay cells; and
   multiple sampling circuits configured to sample the input signal at different taps in the delay line and to output sampled values;

wherein the delay line has (i) a finer resolution closer to a target tap and (ii) a coarser resolution farther away from the target tap on each side of the target tap.

2. The apparatus of claim 1, wherein:
taps nearer the target tap are closer to each other in order to support the finer resolution; and
taps farther from the target tap are farther apart from each other in order to support the coarser resolution.

3. The apparatus of claim 2, wherein the taps are arranged symmetrically around the target tap.

4. The apparatus of claim 2, wherein:
the taps nearer the target tap comprise taps separated from each other by a single one of the delay cells; and
the taps farther from the target tap comprise (i) taps separated from each other by two of the delay cells and (ii) taps separated from each other by four of the delay cells.

5. The apparatus of claim 1, further comprising:
an encoder configured to encode the sampled values in order to generate an encoded value.

6. The apparatus of claim 5, wherein:
the encoder is configured to generate the encoded value based on how far a pulse in the input signal propagates through the delay line during a specified amount of time; and
the encoded value identifies a last of the taps where the pulse in the input signal was sampled by the sampling circuits.

7. The apparatus of claim 6, wherein:
the encoder is configured to generate an encoded value of zero when the pulse in the input signal reaches the target tap and does not reach a subsequent tap during the specified amount of time; and
the encoder is configured to generate an encoded value with a non-zero value when the pulse in the input signal either does not reach the target tap or does reach the subsequent tap during the specified amount of time, wherein a first bit of the non-zero encoded value identifies whether the pulse in the input signal (i) failed to reach the target tap or (ii) passed the target tap.

8. A system comprising:
a powered component; and
a voltage regulator configured to generate a regulated voltage for the powered component;
wherein the powered component comprises a hardware performance monitor (HPM) comprising:
a delay line comprising multiple delay cells coupled in series, the delay line configured to receive an input signal and to propagate the input signal through the delay cells; and
multiple sampling circuits configured to sample the input signal at different taps in the delay line and to output sampled values;
wherein the delay line has (i) a finer resolution closer to a target tap and (ii) a coarser resolution farther away from the target tap on each side of the target tap.

9. The system of claim 8, wherein:
taps nearer the target tap are closer to each other in order to support the finer resolution; and
taps farther from the target tap are farther apart from each other in order to support the coarser resolution.

10. The system of claim 9, wherein:
the taps nearer the target tap comprise taps separated from each other by a single one of the delay cells; and
the taps farther from the target tap comprise (i) taps separated from each other by two of the delay cells and (ii) taps separated from each other by four of the delay cells.

11. The system of claim 8, wherein each of the delay cells is configured to provide a delay that varies based on the regulated voltage.

12. The system of claim 8, wherein:
the HPM further comprises an encoder configured to encode the sampled values in order to generate an encoded value;
the encoder is configured to generate the encoded value based on how far a pulse in the input signal propagates through the delay line during a specified amount of time; and
the encoded value identifies a last of the taps where the pulse in the input signal was sampled by the sampling circuits.

13. The system of claim 12, further comprising:
an adaptive voltage scaling (AVS) controller configured to adjust the generation of the regulated voltage by the voltage regulator based on the encoded value.

14. The system of claim 13, wherein the powered component comprises the AVS controller.

15. The system of claim 8, wherein:
the powered component comprises a processing device having a core; and
the core of the processing device comprises the HPM.

16. A method comprising:
propagating an input signal through a delay line comprising multiple delay cells coupled in series; and
sampling the input signal at different taps in the delay line to generate sampled values;
wherein the delay line has (i) a finer resolution closer to a target tap and (ii) a coarser resolution farther away from the target tap on each side of the target tap.

17. The method of claim 16, wherein:
taps nearer the target tap are closer to each other in order to support the finer resolution; and
taps farther from the target tap are farther apart from each other in order to support the coarser resolution.

18. The method of claim 16, further comprising:
encoding the sampled values to generate an encoded value;
wherein the encoded value identifies a last of the taps where a pulse in the input signal was sampled.

19. The method of claim 18, further comprising:
generating, based on the encoded value, one or more control signals that adjust a regulated voltage when the target tap is not the last tap where the pulse in the input signal is sampled;
wherein a delay provided by each of the delay cells varies based on the regulated voltage.

20. The method of claim 19, further comprising:
adjusting the regulated voltage until the target tap is a last tap where a subsequent pulse in the input signal is sampled.

* * * * *